June 28, 1938.　　　　　H. SLOAN　　　　　2,122,299
DISPENSING TOP
Filed Sept. 20, 1937
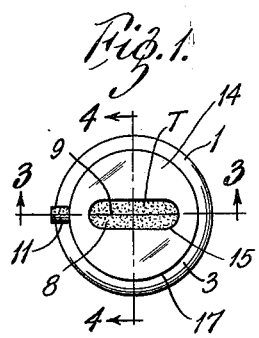
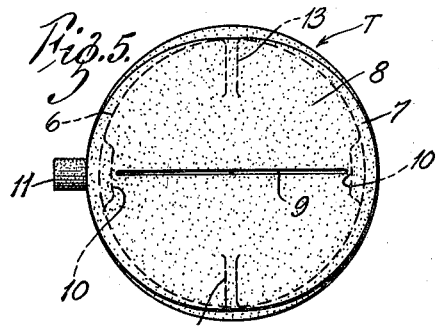
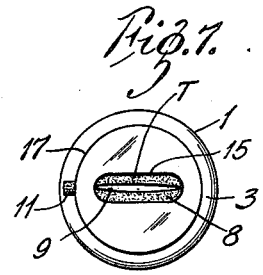
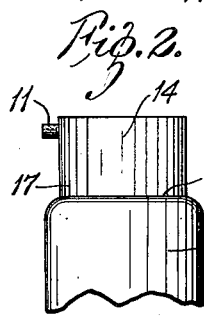
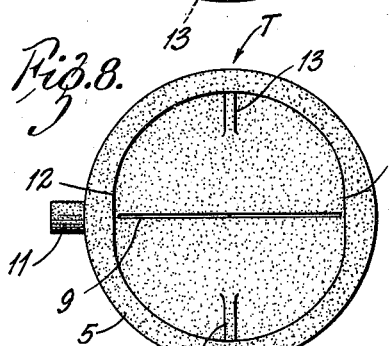
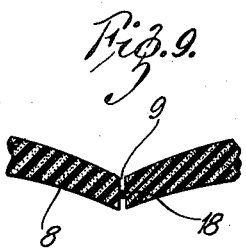
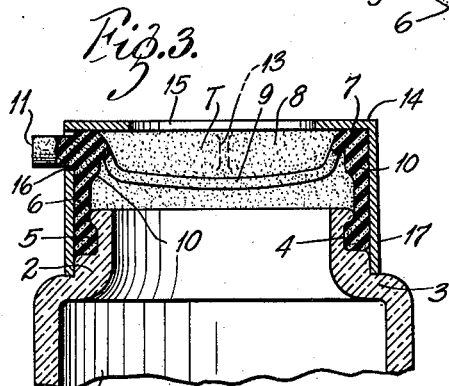
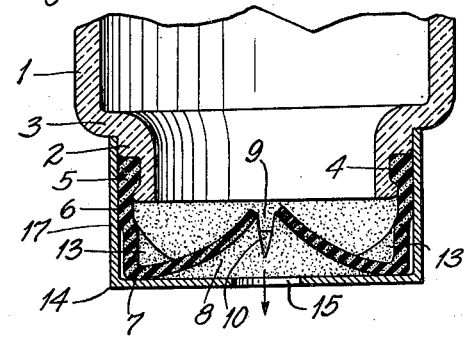
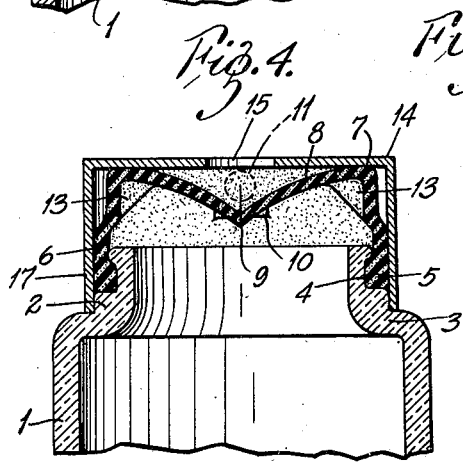
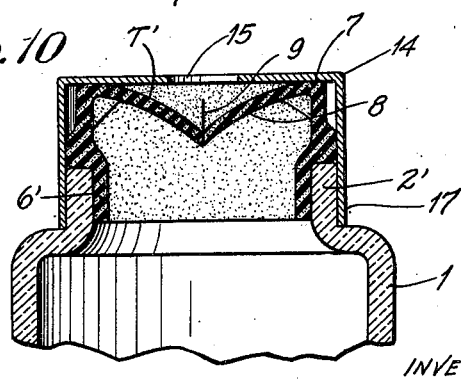
INVENTOR:
Harry Sloan
by Carr, Kerr & Gravely,
HIS ATTORNEYS.

Patented June 28, 1938

2,122,299

UNITED STATES PATENT OFFICE 2,122,299

DISPENSING TOP

Harry Sloan, St. Louis County, Mo., assignor of one-half to A. Evan Hughes, Overland, Mo.

Application September 20, 1937, Serial No. 164,642

11 Claims. (Cl. 221—61)

My invention relates to dispensing tops for containers of powder or liquid and has for its principal object a top that is easily manipulated to dispense a small quantity of material and which closes automatically. The invention consists in the dispensing top and in the parts and combinations and arrangements of parts hereinafter described and claimed.

In the accompanying drawing,

Fig. 1 is a top plan view of a dispensing top embodying my invention including a protective casing, Fig. 2 is a side elevation, Fig. 3 is a sectional view on an enlarged scale on the line 3—3 in Fig. 1, Fig. 4 is a sectional view on an enlarged scale on the line 4—4 in Fig. 1, Fig. 5 is a plan view of the resilient dispensing member with the protective casing removed, Fig. 6 is a sectional view in the same plane as Fig. 4, but showing the container inverted and the dispensing top in open or dispensing position, Fig. 7 is a plan view similar to Fig. 1, showing the top in open or dispensing position, Fig. 8 is a bottom plan view of the top member, Fig. 9 is a detail sectional view across the dispensing opening, showing the parts of the top as originally joined together for shipping purposes; and Fig. 10 is a view similar to Fig. 4 showing a modification.

The drawing illustrates the upper portion 1 of a glass bottle or other container, such as is used for tooth powder, face powder or the like, having a neck 2 that has a square shoulder 3 where it joins the body 1 of the container and that has an annular groove 4 near the upper end.

Seated in said annular groove 4 is an annular beaded portion 5 at the lower end of a sleeve member 6 of a dispensing top of rubber or other resilient material, indicated generally by T. The upper end 7 of said sleeve member 6 is closed by a dished cover member 8 which has a slit 9 extending from one side to the other thereof. The sleeve member 6 is provided with thickened pads 10 at the ends of said slit. Projecting from the upper portion 7 of the sleeve member 6 in line with one end of said slit 9 is a lug 11 or boss which may be pressed to cause the dished cover member to spread open along the slit. As indicated at 12, the beaded portion 5 of the sleeve 6 may be internally thickened adjacent to the ends of said slit 9, giving the inside of the bead a slightly oval shape. When the sleeve is forced onto the container, the bead is forced into circular shape and a strain set up in the top tending to force the sides of the slit together. Opposite the middle of the slit, reinforcing webs 13 may extend across the meeting edges of the sleeve 6 and the cover 8.

The resilient dispensing member T may be protected by means of a metallic or other cap 14 fitting the resilient member adjacent to the ends of the slit, the upper portion of the resilient member T being spaced from said cap along the side portions of said resilient member, so as to allow for spreading thereof as the slit 9 is widened. As shown in the drawing, the desired space may be provided by making the upper portion 7 of the sleeve 6 of oval shape with its minor axis transverse to said slit and gradually increasing the minor axis so that the oval portion merges into the sleeve portion 6 that fits over the container neck 2. Said cap 14 has a slot 15 in alinement with the slit of the dispensing top and an opening 16 in its side through which the boss 11 projects.

The lower sleeve portion 17 of the cap rests against the body of the container and engages the sleeve portion 6 of the dispensing top T. Originally, the dispensing top T may have a thin connecting web 18 closing the slit 9 (as shown in Fig. 9) so as to prevent leakage during transit. This web 18 may be easily broken by any sharp instrument.

In the modification shown in Fig. 10, the dispensing top T' has a depending cylindrical sleeve portion 6' that fits within the neck 2' of the container.

The above described top easily and quickly dispenses a small quantity of powder or liquid and automatically closes. It may be operated with one hand and there are no separate parts to lose. Obviously numerous changes may be made without departing from the invention and I do not wish to be limited to the precise construction shown.

What I claim is:

1. A dispensing top of resilient material for containers comprising a sleeve portion mountable at the mouth of the container, an integral dished cover portion having a diametral slit and a boss in line with one end of said slit, whereby pressure on said boss opens said slit to permit escape of contents of the container if it is inverted while said slit is open.

2. A dispensing top of resilient material for containers having a circular mouth comprising a sleeve portion having a bead mountable over said mouth and a cover portion having a diametral slit, said bead being internally thickened adjacent to the ends of said slit, whereby forcing said sleeve over said mouth closes said slit and pressure on said sleeve in line with said slit opens it.

3. A dispensing top of resilient material for containers having a circular mouth comprising a sleeve portion having a bead mountable over said mouth and a cover portion having a diametral slit, said bead being internally thickened adjacent to the ends of said slit, and said sleeve being internally thickened adjacent to the ends of said slit, whereby forcing said sleeve over said mouth closes said slit and pressure on said sleeve in line with said slit opens it.

4. A dispensing top of resilient material for containers comprising a sleeve portion mountable at the mouth of the container, an integral dished cover portion having a diametral slit and a boss in line with one end of said slit, whereby pressure on said boss opens said slit to permit escape of contents of the container if it is inverted while said slit is open, said sleeve being thickened on its inner side at the ends of said slit.

5. A dispensing top of resilient material for containers comprising a sleeve portion mountable at the mouth of the container, an integral dished cover portion having a diametral slit and a boss in line with one end of said slit, whereby pressure on said boss opens said slit to permit escape of contents of the container if it is inverted while said slit is open, and a cap covering said resilient member, said cap having a slot in line with said slit and an opening through which said boss projects.

6. A dispensing top of resilient material for containers comprising a sleeve portion mountable at the mouth of the container, an integral dished cover portion having a diametral slit and boss in line with one end of said slit, whereby pressure on said boss opens said slit to permit escape of contents of the container if it is inverted while said slit is open, said sleeve being thickened on its inner side at the ends of said slit, and a cap covering said resilient member, said cap having a slot in line with said slit and an opening through which said boss projects.

7. A dispensing top of resilient material for containers comprising a sleeve portion mountable at the mouth of the container, an integral dished cover portion having a diametral slit and a boss in line with one end of said slit, whereby pressure on said boss opens said slit to permit escape of contents of the container if it is inverted while said slit is open, said sleeve being thickened on its inner side at the ends of said slit, and a cap covering said resilient member, said cap having a slot in line with said slit and an opening through which said boss projects, the upper portion of said resilient member being of oval shape with its minor axis transverse to said slit, whereby a space is left between the cap and the sides of the resilient member to accommodate spreading of the resilient member.

8. A dispensing top of resilient material for containers having a circular mouth comprising a sleeve portion having a bead mountable over said mouth, an integral dished cover portion having a diametral slit and a boss in line with the end of said slit, said bead being internally thickened adjacent to the ends of said slit, said sleeve also being internally thickened adjacent to the ends of said slit, and a cap covering said resilient member, said cap having a slot in line with said slit and an opening through which said boss projects.

9. A dispensing top of resilient material for containers having a circular mouth comprising a sleeve portion having a bead mountable over said mouth, an integral dished cover portion having a diametral slit and a boss in line with the end of said slit, said bead being internally thickened adjacent to the ends of said slit, said sleeve also being internally thickened adjacent to the ends of said slit, and a cap covering said resilient member, said cap having a slot in line with said slit and an opening through which said boss projects, the upper portion of said resilient member being oval with its minor axis transverse to said slit.

10. A dispensing top of resilient material for containers having a neck portion with an annular groove therearound, comprising a sleeve portion mountable over the neck of the container, said sleeve portion having an annular bead seatable in said groove, an integral dished cover portion having a diametral slit and a boss in line with one end of said slit, whereby pressure on said boss opens said slit to permit escape of contents of the container if it is inverted while said slit is open.

11. A dispensing top of resilient material for containers having a neck portion with an annular groove therearound, comprising a sleeve portion mountable over the neck of the container, said sleeve portion having an annular bead seatable in said groove, an integral dished cover portion having a diametral slit and a boss in line with one end of said slit, whereby pressure on said boss opens said slit to permit escape of contents of the container if it is inverted while said slit is open, and a cap covering said resilient member, said cap having a slot in line with said slit and an opening through which said boss projects.

HARRY SLOAN.